United States Patent
Joshi et al.

(10) Patent No.: US 8,988,195 B2
(45) Date of Patent: Mar. 24, 2015

(54) SYSTEM AND METHOD OF LOCATING USERS INDOORS

(75) Inventors: Avinash Joshi, San Jose, CA (US); Saurabh Bhargava, San Jose, CA (US); Radhakrishnan Suryanarayanan, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/598,785

(22) Filed: Aug. 30, 2012

(65) Prior Publication Data
US 2013/0249672 A1 Sep. 26, 2013

Related U.S. Application Data

(60) Provisional application No. 61/613,864, filed on Mar. 21, 2012.

(51) Int. Cl.
*H04Q 5/22* (2006.01)
*G01C 21/20* (2006.01)
*G01S 5/02* (2010.01)

(52) U.S. Cl.
CPC ............ *G01S 5/0289* (2013.01); *G01C 21/206* (2013.01)
USPC .................... 340/10.2; 340/10.42; 340/568.1; 340/572.1

(58) Field of Classification Search
CPC ............ G06K 7/0008; G06K 7/10009; G06K 2017/0051; G01S 5/02; G01S 5/14; G01S 5/0284; G01S 5/0289; G01S 5/0294
USPC .......... 340/10.1–10.6, 568.1, 568.8, 340/571–572.9, 10.1–10.52
See application file for complete search history.

(56) References Cited

U.S. PATENT DOCUMENTS

| | | | |
|---|---|---|---|
| 7,536,188 B1 | 5/2009 | Fegan et al. | |
| 8,060,018 B2 | 11/2011 | Davis et al. | |
| 2005/0099298 A1* | 5/2005 | Mercer et al. | 340/572.1 |
| 2006/0015408 A1* | 1/2006 | Brown | 705/22 |
| 2006/0033609 A1 | 2/2006 | Bridgelall | |
| 2006/0214792 A1* | 9/2006 | Goyal et al. | 340/572.1 |
| 2007/0057774 A1* | 3/2007 | Kawamata | 340/10.51 |

(Continued)

FOREIGN PATENT DOCUMENTS

| | | | | |
|---|---|---|---|---|
| EP | 1501034 A1 * | 1/2005 | | G06F 17/60 |
| EP | 1762959 A2 * | 3/2007 | | G06K 7/00 |

(Continued)

OTHER PUBLICATIONS

International Search Report and Written Opinion in counterpart application PCT/US2013/026799 mailed May 22, 2013.
"Relative Location Estimation in Wireless Sensor Networks" by Neal Patwari et al., IEEE Transactions on Signal Processing, vol. 51, No. 8, Aug. 2003, pp. 12.
Machine translation of JP2005-235180 obtained from Japan Patent Office Website.

*Primary Examiner* — Hai Phan
*Assistant Examiner* — Orlando Bousono
(74) *Attorney, Agent, or Firm* — Brian M. Mancini

(57) ABSTRACT

Indoor locationing using radio frequency based tags includes distributing a plurality of radio frequency based tags at mapped locations within the indoor environment. The radio frequency based tags periodically transmit their identity information in a message. A mobile device in proximity to at least one of the radio frequency based tags receives the message. A location of the mobile device is associating to the mapped location of the radio frequency based tag identified in the received message.

16 Claims, 2 Drawing Sheets

(56) References Cited

U.S. PATENT DOCUMENTS

| | | | |
|---|---|---|---|
| 2007/0268138 A1* | 11/2007 | Chung et al. | 340/572.1 |
| 2007/0296581 A1* | 12/2007 | Schnee et al. | 340/572.1 |
| 2008/0231420 A1* | 9/2008 | Koyama et al. | 340/10.1 |
| 2009/0128360 A1* | 5/2009 | Bianchi et al. | 340/825.49 |
| 2009/0195360 A1* | 8/2009 | Jeon et al. | 340/10.1 |
| 2009/0201166 A1* | 8/2009 | Itagaki et al. | 340/686.1 |
| 2009/0289767 A1* | 11/2009 | Tanaka | 340/10.1 |
| 2009/0309750 A1* | 12/2009 | Deuber et al. | 340/825.2 |
| 2011/0060652 A1* | 3/2011 | Morton | 705/14.58 |
| 2012/0050098 A1 | 3/2012 | Kuehnel et al. | |

FOREIGN PATENT DOCUMENTS

| | | | | |
|---|---|---|---|---|
| EP | 1145189 B1 * | 5/2008 | | G06K 17/00 |
| EP | 1950686 A2 * | 7/2008 | | G06K 7/00 |
| EP | 2067272 B1 * | 8/2010 | | G06K 7/00 |
| JP | 2005235180 A * | 9/2005 | | G06K 17/00 |
| WO | 0106401 A1 | 1/2001 | | |

* cited by examiner

SYSTEM AND METHOD OF LOCATING USERS INDOORS

CROSS-REFERENCE To RELATED APPLICATIONS

The present non-provisional patent application claims priority to U.S. Provisional Patent Application Ser. No. 61/613,864, filed Mar. 21, 2012 and entitled "System And Method Of Locating Users Indoors," which is incorporated in full by reference herein.

FIELD OF THE DISCLOSURE

The present invention relates generally to indoor locationing using radio frequency based tags.

BACKGROUND

Locating users inside a building, store, mall, airports, and the like, within a high-level accuracy is a well known problem in the industry. Traditional techniques for locating a wireless communication device within an environment include received signal strength indications (RSSI), time difference of arrival (TDOA), angle of arrival, etc. However, these techniques all suffer from a lack of accuracy, i.e. accuracy is on the order of 60-100 feet. This is not sufficiently accurate for an indoor environment.

In addition, present location techniques are subject to interference due to reflections off of metal surfaces, i.e. multipath.

Hence, there is a need of a technique to provide the ability for more accurate locationing of a device within an indoor environment. In particular, it is desirable to provide indoor locationing accuracy to within three to four feet, i.e. within an aisle of a store for example.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
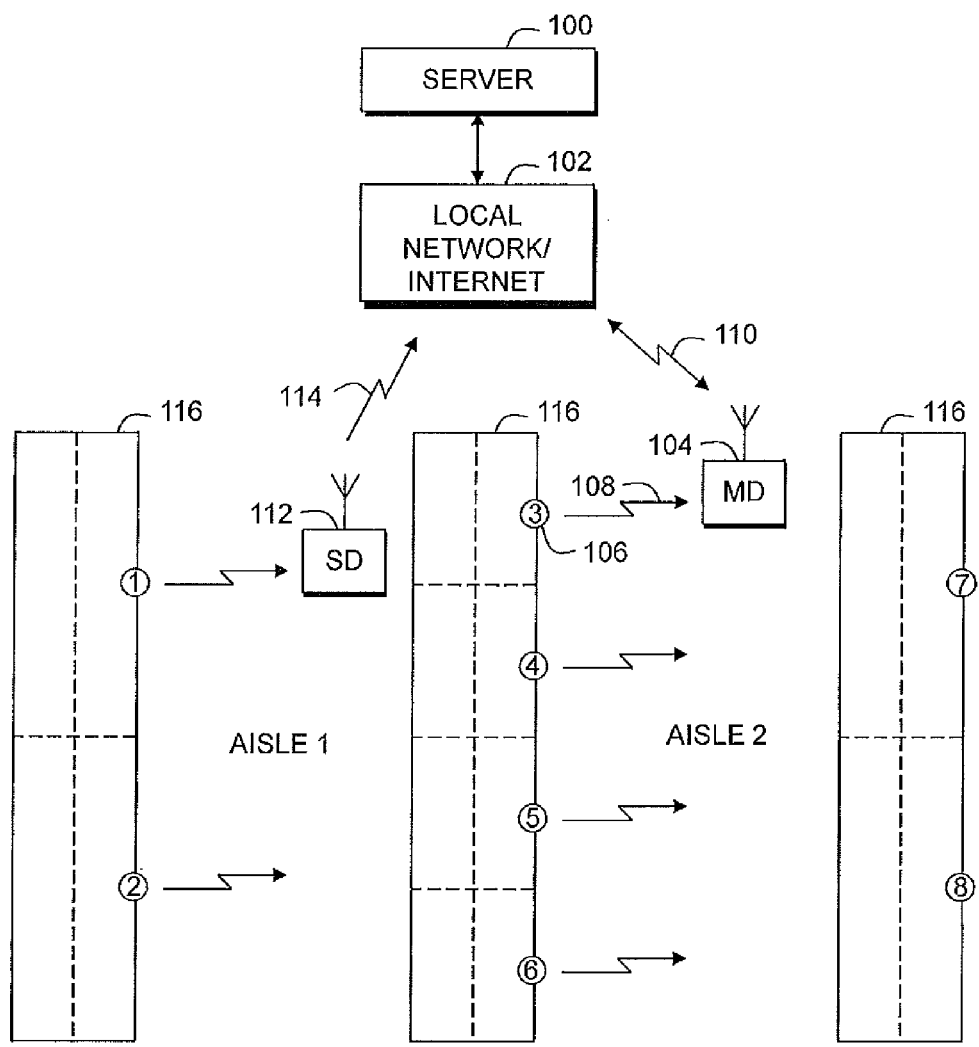
FIG. 1 is a simplified block diagram of a locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to provide more accurate locationing of a device within an indoor environment. In particular, the present invention can provide indoor locationing accuracy to within three to fifteen feet, i.e. within an aisle of a store for example.

In an exemplary embodiment, such as shown in FIG. 1, the present invention utilizes radio frequency and associated protocols, but the present invention can be utilized with other protocols such as IEEE 802.11 (i.e. Wi-Fi), Bluetooth, and the like.

Those skilled in the art will recognize that FIG. 1 does not depict all of the equipment necessary for system to operate but only those system components and logical entities particularly relevant to the description of embodiments herein. Each of the devices shown in FIG. 1 are known to also comprise basic interconnected components such as, but not limited to, radios, transceivers, antennas, keypads, speakers, microphones, displays, memories, interfaces and processors, such as microprocessors, microcontrollers, digital signal processors, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement a processor that performs the given logic. Therefore, each internet/cellular network entity and mobile device represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the tunnel configuration aspect of the present invention may be implemented in any of the devices listed above or distributed across such components. It is within the contemplation of the invention that the operating requirements of the present invention can be implemented in firmware or hardware, with the function being implemented in a software processor (or a digital signal processor) being merely a preferred option.

Referring to FIG. 1, a system architecture is illustrated with connectivity to a local area network or the Internet 102 operable to provide wireless communications between at least one scanning device 112 and/or mobile device 104, and a central/distributed server 100 according to an exemplary embodiment of the present invention. The network can include other entities (not shown) as are known in the art to provide wireless connectivity to multiple wireless mobiles. The system is operable within an indoor environment that can include multiple shelving units 116 (three shown in top view), where each shelving unit can have multiple shelf elevations.

The present invention distributing a plurality of radio frequency based tags 106 at mapped locations (eight locations shown) within the indoor environment. In particular, it is envisioned to use small battery-powered, low cost tags that use a wireless technology such as Wi-Fi, Bluetooth, etc. These tags will be placed throughout an environment where locationing is desired. In the example herein, tags are placed within a retail environment, such as a store. In this example, tags are placed on shelving units 116. The tags can be placed at uniform locations on the shelves, i.e. at the same height and at uniform spacing, or can be placed at various elevations at different spacings. It should be understood that in other environments with or without shelving, tags can be placed at any fixed locations. In the example shown, tags are placed more closely in aisle 2 than in aisle 1, to better locate the mobile device 104 therein, for whatever reason the retailer may desire.

When initially installing the tags within the environment, an installer will affix each tag 106 (eight shown) at predetermined locations in the environment, such as by using a map or planogram of the environment. For example, the installer can have a tablet and/or scanning device 112 with a map of locations where tags need to be deployed. The installer can then affix each tag at its proper location according to the map. The installer can then scan a bar code or read a message transmitted by the tag by the scanning device at the physical location of that tag to obtain the identification of the tag, and select the location from the map where that tag was installed, thereby associating the tag to the physical location. The scanning device can be a tablet, radio frequency identification scanner, the mobile device itself, or other scanning device. The actual association can be performed in the tablet and forwarded 114 to the central/distributed server 100, via the local area network/Internet 102, or the location/identity information can be transmitted to the server, which will record the association.

In operation, the radio frequency based tags, such as a Radio Frequency Identification (RFID) tags for example, periodically or otherwise transmit their identity information in a message 108. The radio frequency based tags are operable to transmit their message at a limited power level such that a transmit range of neighboring tags that can be received by the mobile device does not significantly overlap. The message can be transmitted once a second. The message can be received by a mobile device 104 in proximity to at least one of the radio frequency based tags 106, such as when a user of the mobile device walks in front of the tag. The mobile device can be a smartphone including a loyalty application installed therein operable within the environment to receive the message or can be a dedicated device mounted on a cart usable within the indoor environment. The mobile device can include a display, which is operable to display identities of detected proximal radio frequency based tags. The mobile device can then relay the message 110 including the tag identity, and its own identity, to a central/distributed server 100 via the network 102. In this way the central/distributed server can associate a location of the mobile device to the mapped location of the radio frequency based tag identified in the received message. Alternatively, the mobile device can perform this operation internally to determine its physical location and report this location along with its own identity to the server. Optionally, the central/distributed server can validate 110 the physical location with the mobile device. Since the central/distributed server knows the exact location of each identified tag, it will now know the exact location of the mobile device user. Further, the mobile device can include a display, which can display the identities of detected proximal radio frequency based tags.

These same steps can be repeated once the user moves in front of other tags, such that the mobile device is able to receive other messages as it moves in proximity to other radio frequency based tags, and the association of the mobile device with these other locations can be used to detect, note, or track a movement of the mobile device.

In order to increase locationing accuracy, it is envisioned that the radio frequency based tags transmit their message at a limited power level such that a transmit range of neighboring tags that can be received by the mobile device does not significantly overlap. In this way a mobile device will receive a message from only one tag at a time. It is also envisioned that the tags are deployed such that a mobile device moving within the environment will always be able to receive a message from at least one tag. For example, tags could successfully be deployed using six-foot spacing therebetween.

In the above example, a smartphone was used for the mobile device 104. However, the mobile device could be a dedicated device mounted on a cart for use within the indoor environment.

Figure 2:
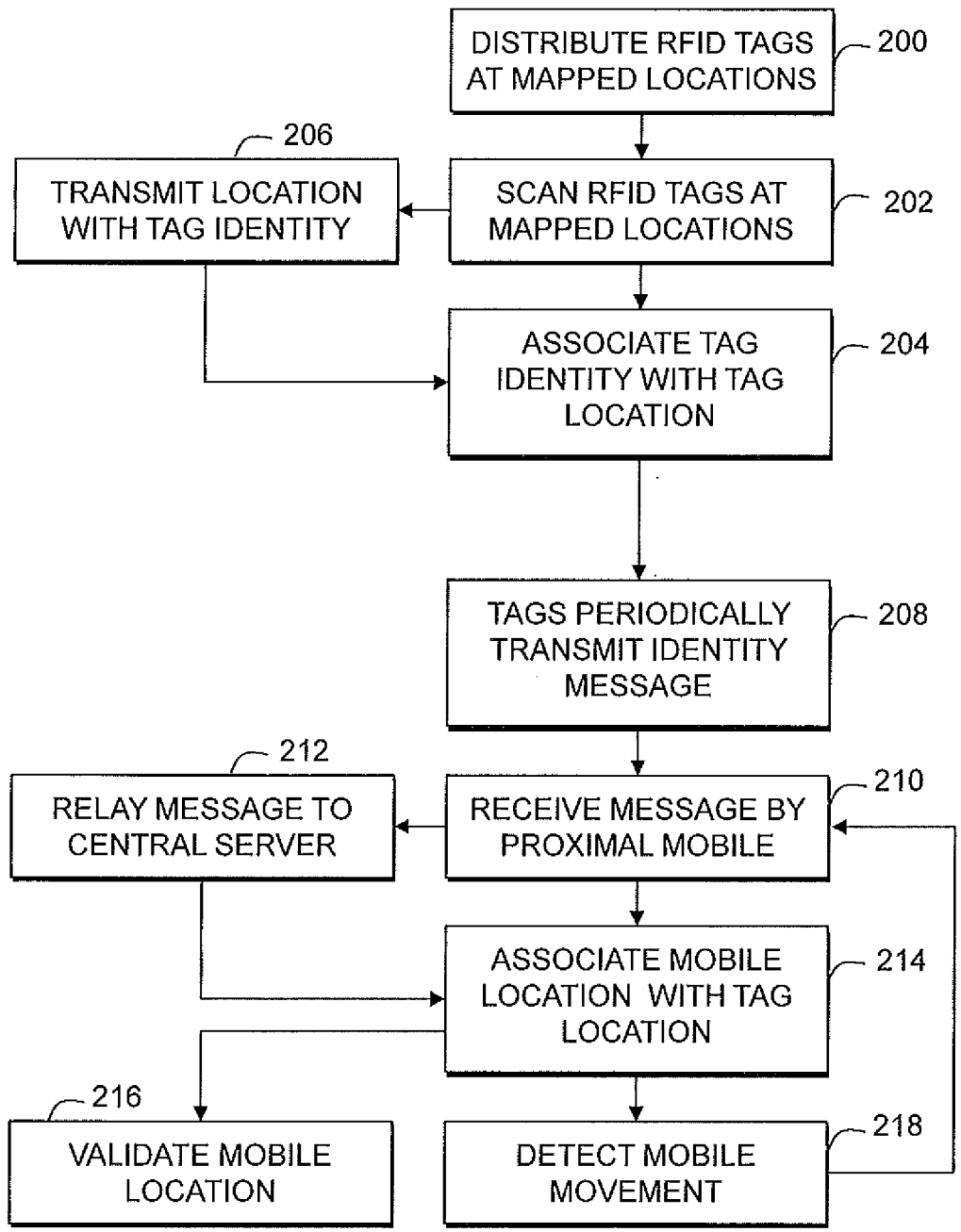
FIG. 2 is a flow diagram of the operation of the system of FIG. 1.

FIG. 2 presents a flow chart that illustrates a method for locationing using radio frequency based tags within an indoor environment, according to an exemplary embodiment of the present invention.

A first step 200 includes distributing a plurality of radio frequency based tags at mapped locations within the indoor environment.

A next step 202 includes scanning each installed radio frequency based tag by a scanning device at the physical location of that tag to obtain the identification of the tag. The scanning device can be a tablet, radio frequency identification scanner, the mobile device itself, or other scanning device.

A next step 204 includes associating each physical tag location with each identified radio frequency based tag.

Optionally, a next step 206 includes transmitting each physical location and the identity of the radio frequency based tag associated with that physical location by the scanning device to a central/distributed server. This can be accomplished by the mobile device having an application installed therein, operable within the environment and operable to transmit the message to the central/distributed server.

A next step 208 the radio frequency based tags periodically transmitting their identity information in a message. The radio frequency based tags are operable to transmit their message at a limited power level such that a transmit range of neighboring tags that can be received by the mobile device does not significantly overlap. The message can be transmitted once a second.

A next step 210 includes receiving the message by a mobile device in proximity to at least one of the radio frequency based tags. The mobile device can be a smartphone including an application installed therein operable within the environment to receive the message or can be a dedicated device mounted on a cart usable within the indoor environment. The mobile device can include a display, which is operable to display identities of detected proximal radio frequency based tags.

Optionally, a next step 212 includes relaying the message by the mobile device to a central/distributed server.

A next step 214 includes associating a location of the mobile device to the mapped location of the radio frequency based tag identified in the received message. This step can be performed in the mobile device or performed by the central/distributed server to determine a physical location of the mobile device.

Optionally, a next step 216 includes the central/distributed server validating the physical location with the mobile device.

Steps 208-214 can be repeated such that the receiving step 210 is able to receive other messages as the mobile device moves in proximity to other radio frequency based tags, and wherein the associating step 214 uses these other messages to detect or note 218 the movement of the mobile device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for locationing using battery-powered radio frequency based tags within an indoor environment, comprising:

distributing a plurality of battery-powered radio frequency based tags at fixed mapped locations within the indoor environment;

obtaining an identification of each of the plurality of battery-powered radio frequency based tags;

selecting a fixed mapped location where said each of the plurality of battery-powered radio frequency based tags was installed to associate said each of the plurality of battery-powered radio frequency based tags to a physical location corresponding to said fixed mapped location within the indoor environment; said each of the plurality of battery-powered radio frequency based tags periodically transmitting its identity information without being interrogated in a message, wherein said each of the plurality of battery-powered radio frequency based tags is operable to transmit said message at a power level that is limited by said each of the plurality of battery-powered radio frequency based tags such that a transmit range of said each of the plurality of battery-powered radio frequency based tags at fixed mapped locations of neighboring battery-powered radio frequency based tags of the plurality of battery-powered radio frequency based tags that can be received by a mobile device moving within the indoor environment does not significantly overlap such that the mobile device moving within the indoor environment will always be able to receive said message from only one battery-powered radio frequency based tag at a time while moving within the indoor environment;

receiving said message by said mobile device moving within the indoor environment when in proximity to at least one of the plurality of battery-powered radio frequency based tags; and associating a physical location of the mobile device moving within the indoor environment to a fixed mapped location within the indoor environment of the at least one of the plurality of battery-powered radio frequency based tags identified in the received message.

2. The method of claim 1, wherein the receiving step further comprises the mobile device moving within the indoor environment receiving other messages from other battery-powered radio frequency based tags of the plurality of battery-powered radio frequency based tags as the mobile device moving within the indoor environment moves in proximity to the other battery-powered radio frequency based tags, and further wherein the associating step comprises using the other messages to note the movement of the mobile device moving within the indoor environment.

3. The method of claim 1, further comprising the step of relaying said message by the mobile device moving within the indoor environment to a central/distributed server, and wherein the associating step is performed by the central/distributed server to determine the physical location of the mobile device moving within the indoor environment.

4. The method of claim 3, further comprising the step of the central/distributed server validating the physical location of the mobile device moving within the indoor environment with said mobile device.

5. The method of claim 1, wherein the obtaining step further comprises scanning said each of the plurality of battery-powered radio frequency based tags by a scanning device at a physical location of said each of the plurality of battery-powered radio frequency based tags to obtain said identification of said each of the plurality of battery-powered radio frequency based tags; and
wherein the selecting step further comprises associating the physical location of said each of the plurality of battery-powered radio frequency based tags with said identification corresponding to said each of the plurality of battery-powered radio frequency based tags.

6. The method of claim 5, further comprising the step of transmitting the physical location of said each of the plurality of battery-powered radio frequency based tags and said identification corresponding to said each of the plurality of battery-powered radio frequency based tags associated with the physical location of said each of the plurality of battery-powered radio frequency based tags by the scanning device to a central/distributed server.

7. A system for locationing using battery-powered radio frequency based tags within an indoor environment, comprising:
a plurality of battery-powered radio frequency based tags operable at distributed fixed mapped locations within the indoor environment, wherein for each of the plurality of battery-powered radio frequency based tags an identification is obtained for said each of the plurality of battery-powered radio frequency based tags and a fixed mapped location within the indoor environment where said each of the plurality of battery-powered radio frequency based tags was installed is selected to associate said each of the plurality of battery-powered radio frequency based tags to a physical location corresponding to said fixed mapped location within the indoor environment, said each of the plurality of battery-powered radio frequency based tags periodically transmitting its identity information without being interrogated in a message, wherein said each of the plurality of battery-powered radio frequency based tags is operable to transmit said message at a power level that is limited by said each of the plurality of battery-powered radio frequency based tags such that a transmit range of said each of the plurality of battery-powered radio frequency based tags at fixed mapped locations of neighboring battery-powered radio frequency based tags of the plurality of battery-powered radio frequency based tags that can be received by a mobile device moving within the indoor environment does not significantly overlap such that the mobile device moving within the indoor environment will always be able to receive said message from only one battery-powered radio frequency based tag from the plurality of battery-powered radio frequency based tags at a time while moving within the indoor environment; and
said mobile device moving within the indoor environment operable to receive said message when in proximity to at least one of the plurality of battery-powered radio frequency based tags,
wherein a physical location of the mobile device moving within the indoor environment is associated with a fixed mapped location within the indoor environment of the at least one of the plurality of battery-powered radio frequency based tags identified in the received message.

8. The system of claim 7, wherein the mobile device moving within the indoor environment is further operable to receive other messages from other battery-powered radio frequency based tags of the plurality of battery-powered radio frequency based tags as the mobile device moving within the indoor environment moves in proximity to the other battery-powered radio frequency based tags, wherein the other messages are used to note the movement of the mobile device moving within the indoor environment.

9. The system of claim 7, wherein the mobile device moving within the indoor environment is mounted on a cart usable within the indoor environment.

10. The system of claim 7, wherein said each of the plurality of battery-powered radio frequency based tags transmit its message every second.

11. The system of claim 7, wherein the mobile device moving within the indoor environment includes a display, which is operable to display identities of detected proximal battery-powered radio frequency based tags of the plurality of battery-powered radio frequency based tags.

12. The system of claim 7, wherein said message is relayed by the mobile device moving within indoor environment to a central/distributed server, which determines the physical location of the mobile device moving within the indoor environment by associating the physical location of the mobile device moving within the indoor environment to the fixed mapped location within the indoor environment of said at least one of the plurality of battery-powered radio frequency based tags identified in the received message.

13. The system of claim 12, wherein the mobile device moving within the indoor environment includes an application installed therein, operable within the indoor environment and operable to relay said message.

14. The system of claim 12, wherein the central/distributed server is also operable to validate the physical location of the mobile device moving within the indoor environment with said mobile device.

15. The system of claim 7, wherein the plurality of battery-powered radio frequency based tags are initially installed at said distributed fixed mapped locations within the indoor environment, wherein each installed battery-powered radio frequency based tag is scanned by a scanning device at a physical location of said each of the plurality of battery-powered radio frequency based tags to obtain said identity information of said each of the plurality of battery-powered radio frequency based tags, and wherein the physical location of said each of the plurality of battery-powered radio frequency based tags is associated with said identity information corresponding to said each of the plurality of battery-powered radio frequency based tags.

16. The system of claim 15, wherein the scanning device is further operable to transmit the physical location of said each of the plurality of battery-powered radio frequency based tags and said identity information corresponding to said each of the plurality of battery-powered radio frequency based tags associated with the physical location of said each of the plurality of battery-powered radio frequency based tags to a central/distributed server.

* * * * *